United States Patent Office 3,704,329
Patented Nov. 28, 1972

3,704,329
CATALYTIC HYDRATION OF OLEFINS TO ALCOHOLS
Ermbrecht Rindtorff, Recklinghausen, and Wilhelm Ester, Herne, Westfalen, Germany, assignors to Veba-Chemie Aktiengesellschaft
No Drawing. Continuation-in-part of application Ser. No. 174,396, Feb. 20, 1962. This application Sept. 27, 1966, Ser. No. 582,245
Claims priority, application Germany, Feb. 21, 1961, B 61,372, Patent 1,156,772
Int. Cl. C07c 29/04; B01j 11/82
U.S. Cl. 260—641    5 Claims

ABSTRACT OF THE DISCLOSURE

Catalytic hydration of olefins to alcohols at elevated temperatures and pressures with water in gaseous phase in the presence of a mineral catalyst prepared by impregnating a porous mineral alumina-silicate, e.g. bentonite, having an $Al_2O_3$ content below about 10% by weight with phosphoric acid.

---

This is a continuation-in-part of copending U.S. application Ser. No. 174,396, filed Feb. 20, 1962 now abandoned.

The present invention relates to improvements in catalysts for the catalytic hydration of olefins to alcohols, and more particularly to a mineral alumina-silicate catalyst prepared by impregnating a mineral alumina-silicate having an $Al_2O_3$ content below about 10% by weight with phosphoric acid, and then recovering the so-impregnated silicate.

Techniques for converting olefins to alcohols in the gaseoous phase at increased pressures with water vapor are known. A practical process in this regard relates to the production of ethyl alcohol from ethylene and water. Such process is generally carried out in the presence of catalysts, most often in the form of phosphoric acid impregnated upon a suitable carrier material. In this connection, suitable carrier materials for the phosphoric acid include, for example, activated charcoal, kieselguhr, silicic acid, etc. Nevertheless, these carrier materials have the common disadvantage of an unduly low resistance to solids disintegration or break up whereby a frequent change oof the catalyst must be carried out, entailing, of course, considerable expense and trouble. This is especially true when it is considered that a large scale process is involved.

Another suitable carrier material for phosphoric acid impregnation may be developed from one of the various forms of calcinated diatomaceous earth. This type of carrier material consists for the most part of silicon dioxide in the form of complete or incomplete diatomic skeleton materials, which are held together or interconnected by means of clay or clay-like substances. In such carrier materials, the mechanical solidity or resistance to break up or disintegration is essentially better than that of silica gel, for example. On the other hand, these diatomaceous earth substances possess the disadvantage that during the main reaction, the iron oxides and aluminum oxides contained therein are dissolved out through the action of the impregnated phosphoric acid, whereby clogging disturbances occur in the after-connected apparatus, in particular the regenerators. Specifically, the catalyst carrier material cakes together to form a solid mass soon after the operation commences, so that the impregnated carrier must be replaced with a fresh impregnated carrier after a comparatively short period of time of operation. The frequent change of catalyst occasioned by the poor solidity characteristics of the carrier material, of course, results in a considerable expenditure of time and effort increasing the cost of the over-all operation.

Various proposals have been suggested for the avoidance of these difficulties. Most often, the carrier materials for the catalyst are subjected to a specific treatment. Thus, in accordance with British Patent 786,238, shells of diatoms may first be impregnated with phosphoric acid and then treated at temperatures up to about 400° C. with water vapor or steam. Subsequently, the mass is digested with an aqueous acid solution for an extended period of time, then dried and once again impregnated with phosphoric acid. The catalyst material moodified in this manner possesses an increased resistance to the disintegration or break up (erosion) suffered by catalyst carrier materials formerly employed. Moreover, these modified catalysts exhibit a good activity for the desired purpose and have proved themselves acceptable in extended large-scale operations. With these modified catalysts, the clogging tendencies of the after-connected apparatus are substantially reduced, although even these modified catalyst carrier materials begin to erode or break up after only a few months of operation. For example, the disintegration or break up of the catalyst carrier material becomes clearly evident in the lower third of the catalyst furnace or reaction chamber where accumulations of powdery eroded or rubbed off material are situated, such material blocking off a considerable portion of the flow cross-section of the gaseous reactants. Hence, even with the more modified catalyst carrier materials, only limited periods of operation may be undertaken before the catalyst carrier material must be replaced with fresh material.

It is an object of the present invention to overcome the foregoing disadvantages and to provide improvements in mineral catalysts for the catalytic hydration of olefins to alcohols as well as a process for preparing such catalysts.

It is another object of the invention to provide an improvement in the process for the catalytic hydration of olefins to alcohols at elevated temperatures and pressures with water in gaseous phase, by carrying out the hydration in the presence of a mineral catalyst prepared in accordance with the invention.

Other and further objects of the present invention will become apparent from a study of the within specification and accompanying examples.

It has been found in accordance with the present invention that an effective mineral alumina-silicate catalyst may be prepared which possesses high activity in the process for hydration of olefins to alcohols in the presence of water.

Specifically, in accordance with the invention, a process is provided for producing an olefin hydration catalyst of increased pore volume and very high surface area which comprises treating a mineral alumina-silicate with mineral acid until the $Al_2O_3$ content thereof is reduced to below about 10% by weight of the mineral alumina-silicate, and impregnating the resulting mass with phosphoric acid. Preferably, the mineral acid treatment is continued until the $Al_2O_3$ content is reduced to between about 5 and 1%, and even as low as 0.6%. The mineral alumina-silicate may be a bentonite-containing material or one containing aluminum oxides and iron oxides. The mineral alumina-silicate catalyst carrier starting material of the invention may even be a commercial form bentonite-containing hydrogenation and/or dehydrogenation catalyst material.

In accordance with a preferred embodiment of the invention, the process of the invention contemplates treating with a mineral acid selected from the group consisting of hydrochloric, sulfuric and phosphoric acids, and mixtures thereof, a mineral alumina-silicate selected from the group consisting of bentonite, montmorillonite, fuller's earth, beidellite, nontronite, hectorite, saponite, sauconite, kaolin, and clays containing these silicates, whereby to dissolve out the acid-soluble aluminum content until the $Al_2O_3$ content of the silicate is reduced to below about 10% by weight. The resulting mass may then be impregnated with the phosphoric acid and thereafter dried and recovered. More specifically, the treating may be carried out by treating the silicate at a temperature between about room temperature and about 110° C., with the acid concentration of the treating acid being between about 5–25% by weight and the impregnating acid, i.e. phosphoric acid, having a concentration of between about 50–85% by weight. Of course, the mineral alumina-silicate may be in particle form, and the mass may be washed with water after the heating, and thence air dried at between about 110 and 120° C. After the impregnation, the mass may be removed from excess phosphoric acid and air dried at a temperature between about 110 and 120° C.

The present invention, therefore, represents an improvement in the process for producing an olefin hydration catalyst of increased activity which includes the step of impregnating a porous mineral alumina-silicate having an $Al_2O_3$ content below about 10% by weight with phosphoric acid and recovering the impregnated mass. Furthermore, the invention contemplates an improvement in the process for the catalytic hydration of olefins to alcohols at elevated pressures with water in gaseous phase, which includes the step of carrying out the hydration in the presence of a mineral catalyst prepared in the foregoing manner.

Thus, the present invention represents a surprising discovery that known catalysts, as they are charged, for example, for hydrogenation reactions and/or dehydrogenation reactions, in particular for the splitting, isomerization or reforming of hydrocarbons, may be used with excellent results as catalyst carrier materials for the specific execution of the catalytic hydration of olefins to alcohols in the presence of water, provided such catalyst carrier materials are prepared by the treatment of the present invention.

The catalyst carrier materials in question include commercially available carrier materials, such as those which are produced from bentonite, alone or in admixture with kaolin, etc. in the well known manner. Catalysts of this type contain a high amount of montmorillonite-type minerals, including in addition to montmorillonite, other ingredients, such as beidellite, nontronite, hectorite, saponite, sauconite, etc., these materials often being obtained from clays and clay-like substances containing the same. The foregoing catalyst carrier materials may include varying amounts of aluminum oxide and iron oxide.

Significantly, in the conventional production of catalyst carrier materials, aluminum oxides and iron oxides are partially removed by acid treatment of the carrier material. It is also known to conduct the acid-extraction in such a way that particularly all soluble compounds are removed from the starting material, leaving a porous mass. In the latter instance, however, an addition of aluminum compounds is necessary, in view of the fact that the catalysts prepared from the carrier materials, such as for example in cleavage reactions, only become sufficiently active when at least a minimum content of $Al_2O_3$ is present. Commercial catalyst carrier materials, in this regard, accordingly possess for the most part an $Al_2O_3$ content of at least about 15%.

In accordance with the present invention, on the other hand, excellent effects are achieved where the catalyst carrier material is present in the form of spheres, cylinders, tablets, or other particle forms. The employment of the carrier material in particle form affords excellent results in the catalytic hydration of olefins, provided the carrier materials are pretreated at room temperature or increased temperature up to the boiling point of the mixture, with mineral acids, and thereafter impregnated with the acid catalyst used for the catalytic hydration of olefins. The pretreatment with mineral acid, for example aqueous hydrochloric acid, is carried out in such a manner that $Al_2O_3$ content of below about 10% is obtained in the carrier material. The so-treated carried material surprisingly loses by this pretreatment with mineral acid very little of the extremely high resistance to erosion or rubbing off in contrast to the conventional carrier materials. Such high resistance to erosion or wearing away of the carrier particles is indispensable, for example, in the carrying out of cracking reactions, such as those occurring in a fluidized bed. The resistance to wear of the catalyst carrier materials of the invention is far superior to that of previously employed hydration catalyst materials and at the same time these carrier materials, treated in accordance with the invention, excell by reason of their high absorption capacity for phosphoric acid, i.e. the acid catalyst.

A specific method for preparing the catalyst material in accordance with the invention may be achieved as follows:

The catalyst carrier material, which may be obtained, for example, in the form of small spheres of about 5 mm. diameter, is preferably digested with an aqueous acid solution, such as hydrochloric acid at a concentration of about 5–25%. The acid treatment is conveniently carried out at increased temperature, e.g. 100° C., and is not terminated until the $Al_2O_3$ content of the material is, for instance, about 3% or less. It is most suitable to continue the acid treatment until substantially all aluminum oxide is removed, since under the reaction conditions of the olefin hydration, which is usually carried out at a temperature of about 300° C., the remaining aluminum oxide in the catalyst carrier material will be dissolved out since the $Al_2O_3$ content is soluble in the phosphoric acid used. Therefore, in order to provide a catalyst carrier material which will not undergo any substantial erosion or rubbing away during the hydration reaction, as much of the aluminum oxide should be removed in the pretreatment with acid as possible.

In this connection, it has been determined that surprisingly the catalyst carrier materials of the invention, as noted above, still possess sufficient resistance to erosion or rubbing away, even though the $Al_2O_3$ content has been reduced to as low as 0.6% through the acid pretreatment. Naturally, the quantity of aluminum oxide to be dissolved out in each instance depends upon the type of carrier material employed, but in general it has been demonstrated that catalyst carrier materials exhibit very good suitability for use in the catalytic hydration of olefins, where the carrier material possesses an $Al_2O_3$ content after the acid pretreatment in accordance with the invention of preferably between about 5 and 1%.

The acid pretreatment may take place in a single step or in several successive steps, wherein if necessary different acid concentrations may be used in the various steps. The acid pretreatment may also be carried out in a continuous manner if desired. Upon reaching the $Al_2O_3$ content desired in the particular instance, the catalyst carrier material is then washed and dried, and may be digested once again with water vapor or steam and thereafter dried. As aforesaid, any inorganic acid may be used for the pretreatment of the carrier material in accordance with the invention, including in place of hydrochloric acid, any other mineral acid, such as sulfuric acid, phosphoric acid, mixtures of any of these acids, and the like. Nevertheless, because of the simpler manipulation afforded by hydrochloric acid, this acid is preferred. Once the acid pretreatment has been effected, the now porous carrier material having a very low content of aluminum oxide may be suitably impregnated with phosphoric acid, preferably having a concentration of from about 50 to 85%. Once the impregnation has been achieved, the catalyst impregnated carrier material may be charged immediately for the hydration of olefins, such as in the production of ethyl alcohol from ethylene and water at elevated pressure and a temperature of about 300° C.

After the foregoing pretreatment of the carrier material with acid and the impregnation thereof with phosphoric acid to form the catalyst impregnated carrier material, and after the use of such catalyst material in the production of ethyl alcohol as noted above, the catalyst carrier material exhibits a very high resistance to erosion or wearing away despite the severe reaction conditions of the olefin hydration. By reason of the acid pretreatment which dissolves out the soluble aluminum oxide, the pore volume of the carrier material is substantially increased, although such loss of aluminum oxide by the acid pretreatment does not adversely affect the solidity characteristics of the carrier material. This is quite surprising since it would have been expected that during the acid pretreatment the three dimensional crystal lattice of the montmorillonite-type minerals and clays would be considerably disturbed in their structure due to such increased dissolving out of soluble $Al_2O_3$. In this connection, in order to obtain a suitably high pore volume in the catalyst carrier material, it is advantageous to start with a carrier material with as high as possible an $Al_2O_3$ content, preferably above 16%, so that a greater part of the carrier volume will be dissolved away in the form of aluminum oxide.

As essential feature of the catalysts prepared in accordance with the method of the present invention consists in a surface area for the catalysts which is four times the size of the surface area of other comparable catalysts. The high activity of the catalysts of the present invention is due to this high surface area and the increased pore volume.

This high activity allows a lower reaction temperature to be utilized, yet with high conversion of ethylene and water to ethanol and at the same time a low production of by-products, resulting in an increased yield of ethanol.

The high resistance to erosion or wearing away of the catalyst carrier materials prepared in accordance with the present invention is particularly evident by the following comparison:

Into a drum of 5 liters capacity are added 0.25 kg. of a commercial cracking catalyst K 307, produced by the firm "Südchemie," Germany, and having a spherical shape up to 5 mm. diameter, such catalyst material having been first treated in accordance with the present invention in the manner noted above. The drum is then rotated for 100,000 revolutions in order to ascertain the degree of erosion or wearing away of the spherical particles during that time. In the case of the catalyst carrier material prepared in accordance with the invention, the amount of erosion was only 1.4%. For comparison purposes, an equal quantity is added to the drum which consists of a diatomic shell catalyst material of cylindrically shaped bodies (5 mm. x 2 mm.) and this quantity is rotated in the drum under the same conditions for 100,000 revolutions. This latter catalyst material was pretreated in a special manner analogous for conventional hydration catalyst materials, i.e. the catalyst material was first impregnated with phosphoric acid, then treated at 300° C. for 3 hours with steam and subsequently cooled and digested for one hour with aqueous acid heated to 100° C., and finally washed until acid-free and dried at 125° C. (see British Pat. 786,238). The conventional catalyst carrier material pretreated in this manner and subjected to 100,000 revolutions in the drum exhibited a wearing away or erosion degree of 10%.

Besides the foregoing advantage of almost a ten-fold decrease in erosion as compared with the conventionally prepared catalyst carrier material, the carrier material of the invention possesses an even further advantage. Specifically, apart from the substantially longer life-span of the catalyst carrier material prepared in accordance with the invention, the same is significantly more active than the conventional hydration catalysts. For example, while about 1 kg. of 100% phosphoric acid is required per 200–400 liters of alcohol produced in accordance with the conventional catalyst technique, in accordance with the present invention, with the same quantity of phosphoric acid catalyst, 1,000 to 4,000 liters of alcohol may be produced. This represents a five- to ten-fold increase in the capacity of the catalyst in accordance with the invention as compared with the conventional catalyst material. Such higher capacity may be readily traced back to the increase in pore volume achievable in the catalyst carrier material in accordance with the invention by reason of the particular pretreatment and impregnation steps employed. A further advantage of the invention is the fact that the catalysts prepared by the instant method represent a substantially cheaper form than that required in accordance with the conventional methods. It will be appreciated by the artisan that an acid pretreatment in accordance with the invention is not always required, and may be omitted if the catalyst carrier material which is employed is initially substantially free from aluminum oxide, whereby subsequent acid pre-treatment will not serve to remove any further significant quantities of the oxide or increase the pore volume of the carrier material. Nevertheless, if desired or necessary, a short preliminary treatment of such substances with acid may be carried out in order to assure that all soluble aluminum oxide is removed, since during the olefin hydration any residual aluminum oxide content in the carrier material might be dissolved out under the severe reaction conditions, and accordingly adversely affect the erosion or rubbing away qualities of the catalyst material. Such acid preliminary treatment will also serve to dissolve out other acid-soluble constituents from the starting material low in aluminum oxide content, whereby the pore volume will be increased and the otherwise objectionable soluble constituents will be removed prior to the actual hydration reaction.

In line with the foregoing, it will be appreciated by the artisan that instead of bentonite-containing starting materials and clays, carrier materials formed from other mineral alumina-silicates may be used in accordance with the invention, such as for example kaolin, etc., inasmuch as and insofar as these other mineral alumina-silicates exhibit sufficient resistance to erosion, break-up or wearing away under the reaction conditions of the hydration.

The following examples are set forth for the purpose of illustrating the invention, and it is to be understood that the invention is not to be limited thereby.

EXAMPLE 1

250 grams of a bentonite-containing cracking catalyst, prepared by the firm "Südchemie A.G." under the designation K 307 and in the shape of spheres having a diameter of about 5 mm., were treated for one hour with 400 cc. of a 20% hydrochloric acid solution at a temperature of about 100–110° C., and subsequently washed with 500 cc. of water. This acid treatment and water washing was repeated for a total of five times, and after the fifth treatment the mass was air dried at a temperature of about 110–120° C. The pore volume of the air dried carrier mass amounted to 720–800 cu. centimeters per kg. of carrier mass. The carrier mass was then impregnated with 70% phosphoric acid up to saturation, and the excess phosphoric acid was permitted to run off. The mass, now impregnated with phosphoric acid, is then dried with air at 110–120° C. The carrier mass had absorbed 450 grams of phosphoric acid per kg. of carrier mass.

When the catalyst carrier material produced in the foregoing manner is charged under the conventional conditions for the production of ethyl alcohol from ethylene and water, at elevated pressure and a temperature of about 300° C., it is possible to attain extended periods of operation without difficulties using the catalysts prepared in accordance with the invention, such extended periods of time amounting to substantially more than a year.

EXAMPLE 2

In a reaction furnace of conventional construction, having a capacity of about 38 m.³, which is filled with catalytic substance, 40,000 Nm.³ of an approximately 85% ethylene gas are circulated hourly. The catalyst consists of cracking catalyst material made of bentonite, in the form of pellets of 3 to 5 mm. diameter (mfr.: Südchemie, trademark names K 306 and K 307, respectively). The catalyst material had been pretreated as follows:

750 kg. of K 306 pellets are refluxed at 100–110° C. with 1375 kg. of 11% hydrochloric acid for 10 hours. Then 400 liters of hydrochloric acid are drained out and replaced with 400 liters of 30% hydrochloric acid, so that the total acid concentration amounts to about 17%. After an additional boiling time of 14 hours, all of the acid is drained out and the catalyst is boiled for one hour with enough desalted water to fully cover it. Then the wash water is drained off and again replaced by the same amount of fully desalted water, which is also drained off after one hour of boiling time. This procedure is repeated sixteen times. The final wash water that drains out is then free of chloride and aluminum ions. The catalyst is dried by the injection of dry air at 120° C. The catalyst at this point still contains 3.7% $Al_2O_3$, and has a surface area of 185 m.²/g. and a total porosity of 0.85 (measured at the number of cm.³ of distilled water adsorbed per g. of the carrier). The catalyst is then impregnated with 74% $H_3PO_4$. The excess phosphoric acid is drained away, and the catalyst is dried with hot air at about 100° C.

The catalyst support which results absorbs approximately its own weight in 74% phosphoric acid. 38 metric tons (i.e. about 38,000 kg.) of the catalyst pretreated in the foregoing manner are used in the olefin hydration process described herein.

2.050 Nm.³ of fresh ethylene with a concentration of 99.8% $C_2H_4$ and an acetylene content of less than about 30 p.p.m. are added hourly to the gas. Approximately 50 m.³ of 85% ethylene are removed per hour and recovered as the finished gas. At the same time, about 20 tons of water in the form of water vapor are mixed with the circulating ethylene and about 6.5 kg. of phosphoric acid, calculated as 100% acid, are added. In the regenerators or in the gas washer connected to the output side of the reactor, about 27.3 tons of a 14.5% ethyl alcohol are separated hourly. The reaction temperature is maintained at 285° C. at the input to the catalyzing furnace. The water-to-ethylene ratio is about 0.67:1 at the quantities stated. The ethyl alcohol yield amounted to 95.2% of the amount of ethylene reacted.

EXAMPLE 3

In a catalyzing furnace as used in Example 2, having 38 metric tons of catalyst, 25,000 Nm.³ of a 97% propylene gas are circulated hourly. At the same time, 14.0 tons of water vapor and 0.5 kg. of phosphoric acid, calculated as 100% acid, are mixed with the circulating propylene. 1,400 Nm.³ of fresh propylene (>99.9%) are added hourly to the gas. The working pressure amounts to 40 atmospheres excess pressure and the temperature is 205° C. at the input to the catalyzing furnace. The water-to-propylene ratio amounts to about 0.67:1. After cooling in the heat exchangers and the gas washer, approximately 27.5 metric tons of a dilute isopropyl alcohol at 12.7% are separated from the circulated gas. Approximately 50 m.³ of propylene are removed hourly. The yield amounts to 95% with reference to reacted propylene.

EXAMPLE 4

In the experiments described below, a comparison is made between the results of the process of the invention and the results which are obtained in the catalytic hydration of olefins by the process of the aforementioned British Patent 786,238 (cf. Examples I and II thereof).

Where the catalyst support of the invention is used, its preparation is the same in every detail as extensively described in Example 2 (noted hereinbelow as Experimental Series "a"). Where the catalyst of British Patent 786,238 is used (noted hereinbelow as Experimental Series "b"), the following was the method of its preparation.

50 liters of a diatomite catalyst, namely Celite VIII of Johns-Manville Co., in the form of cylindrical bodies 4 mm. in diameter and about 5 mm. long, are impregnated for one hour at room temperature with 85% phosphoric acid. Then the excess phosphoric acid is allowed to drain away for one hour. The catalyst is then dried for three hours in an electric furnace at 300° C. with air having a water vapor partial pressure of 200 torr, and after cooling, it is digested for one hour at 100° C. with water adjusted by the addition of sulfuric acid to a pH of 0.35. The ratio of water to catalyst by volume amounted to 1.5:1. After the water was removed and the catalyst was drained, the digestion with acidified water was repeated three times and the catalyst was then washed with water until free of acid. The catalyst is then drained and dried at 125° C. and impregnated with 74% $H_3PO_4$, after which excess acid is drained off. The catalyst is then dried with hot air at about 100° C.

In an experimental installation with a catalytic furnace having a volume of 40 liters and filled each time with 38 kg. of the above-described catalyst, 40,000 liters of an approximately 85% ethylene gas were circulated hourly. To the gas were added certain quantities hourly (cf. table below) of fresh ethylene in the form of 99.8% ethylene. Each hour, about 2.66% of the fresh ethylene by volume was relieved of pressure and removed as finished gas. The addition of water was performed simultaneously in the form of water vapor having the molar ratio given in the table below. Such table shows the yields achieved and the other conditions of reaction. The quantities of $H_3PO_4$ added hourly amount to 6 grams per hour, calculated as 100% acid.

The results in the following table establish that the process using the pretreated catalyst of the present invention shows a clear superiority over the diatomaceous catalyst pretreated in the manner of said British patent, both as regards the conversion per passage and as regards the ethanol yield. The experiments were performed in each case over a period of 800 hours.

Specifically, the results indicate that when the catalyst of the present invention is used, a substantial increase in the reaction or conversion per passage is attained over that of the catalyst of said British patent, with, at the same time, a definite increase in yield. These advantages are achieved in addition to the substantially higher stability against erosion of the instant catalyst which has been demonstrated hereinabove.

TABLE

| Exmperiment No. (Series "a" and "b") | Catalyst | Temperature at entrance to catalytic furnace, ° C. | Fresh ethylene added per hr., l. | Conversion per passage, percent | Ethanol yield, percent | Molar ratio $C_2$:$H_2O$ |
|---|---|---|---|---|---|---|
| 1a | K 306 | 260 | 2,110 | 5.0 | 97.8 | 1:0.83 |
| 1b | Celite VIII | 260 | 850 | 2.1 | 94.1 | 1:0.83 |
| 2a | K 306 | 275 | 2,300 | 5.4 | 96.7 | 1:0.83 |
| 2b | Celite VIII | 275 | 1,400 | 3.4 | 93.4 | 1:0.83 |
| 3a | K 306 | 285 | 2,550 | 6.0 | 96.0 | 1:0.83 |
| 3b | Celite VIII | 285 | 1,670 | 4.0 | 92.8 | 1:0.83 |
| 4a | K 306 | 285 | 2,375 | 5.6 | 95.2 | 1:0.60 |
| 4b | Celite VIII | 285 | 1,800 | 4.3 | 92.1 | 1:0.60 |

It will be appreciated in accordance with the present invention that the olefins contemplated herein which may be subjected to the conventional catalytic hydration to form the corresponding alcohols, utilizing the impregnated catalyst materials of the present invention, include normally gaseous olefins, lower olefins, i.e., containing 2–6 carbon atoms, especially lower aliphatic olefins, and more particularly lower alkene, such as ethylene, propylene, butylenes, amylenes, and the like. Thus, the corresponding lower alcohol, especially lower aliphatic alcohol, and more particularly lower alkanol, will be produced, such as ethanol, n-propanol, isopropanol, n-butanol, iso-butanol, sec.-butanol tert.-butanol, pentanols, and the like. The olefins contemplated herein may be derived from any source, such as the thermal or catalytic cracking of petroleum hydrocarbons.

Particularly in accordance with the present invention, the olefins ethylene and/or propylene are preferred as starting materials and these will be converted to the corresponding alcohol, e.g. ethanol, n-propanol and/or isopropanol.

EXAMPLE 5

In order to provide a stricter comparison between the catalysts and process in accordance with the present invention as opposed to the catalyst and process of British Patent 786,238, the following experiments were carried out:

(i) Conventional procedure using catalyst of British Patent 786,238

100 parts by weight of Celite VIII (Johns-Manville Co.), consisting of diatomaceous earth pellets 5/32 by 3/16 inch, are soaked for 1 hour in aqueous phosphoric acid containing 85% by weight $H_3PO_4$. The pellets are drained for 1 hour and then heated at 300° C. for 3 hours at a partial pressure of 200 mm. Hg. The product was cooled and leached by digesting the same for 1 hour at 100° C. with sulfuric acid-acidified water having a pH of 0.35, the volume ratio of water to carrier pellets being 1.5:1. The carrier pellets were then drained and leached a second time with fresh acidified water in the same manner. Then the product was drained and releached twice more with pure water instead of acidified water, finally drained and dried at 125° C. The recovered carrier material was then impregnated for 1 hour in excess aqueous phosphoric acid containing 55% by weight of $H_3PO_4$ and then drained for 2 hours.

200 parts of the catalyst carrier material prepared in the foregoing manner were charged to a reactor and a gaseous mixture of water vapor and ethylene vapor in the molar ratio of 0.5:1.0 was passed through the catalyst bed at a VSVM of 27 (i.e., vapor space velocity per minute determined by dividing the cubic feet of gas per minute at 25° C. and 760 mm. Hg by the bulk volume in cubic feet of the catalyst used, the calculations assuming water vapor and other gases present do not condense). The temperature of the catalyst bed was maintained between 275 and 285° C. and a total pressure of 1,000 p.p.i. was also maintained. No phosphoric acid was added during the run. The conversion level of ethylene to ethanol was 4.3% after 400 hours.

(ii) Conventional procedure using catalyst of invention

In the exact manner noted under (i) above, 100 parts by weight of bentonite-containing catalyst K 306 (Südchemie AG), consisting of 3 to 5 mm. diameter pellets, are treated and the impregnated catalyst obtained is used for the production of ethanol from ethylene under the exact procedure noted under (i) hereinabove. The conversion level of ethylene to ethanol was 5.6% after 400 hours.

(iii) Procedure of invention using catalyst of British Patent 786,238

In the exact manner noted in Example 2 herein, 100 parts of Celite VIII (Johns-Manville Co.), consisting of diatomaceous earth pellets 5/32 by 3/16 inch, are treated and the impregnated catalyst obtained is used for the production of ethanol from ethylene under the exact procedure noted under (i) hereinabove. The conversion level of ethylene to ethanol was 3.7% after 400 hours.

(iv) Procedure of invention using catalyst of invention

In the exact manner noted in Example 2, 100 parts of K 306 bentonite-containing catalyst (Südchemie AG), consisting of 3 to 5 mm. diameter pellets, are treated and the impregnated catalyst obtained is used for the production of ethanol from ethylene under the exact procedure noted under (i) hereinabove. The conversion level of ethylene to ethanol was 3.9% after 400 hours.

Each of the treated carrier materials prepared under the procedures (i) through (iv) was tested for erosion before and after use in the following manner:

250 grams of the particular pellet material are rotated in a drum of 5 liters capacity for 100,000 revolutions. The pellet material prepared under (iv) had an erosion degree of only 1.4% whereas that prepared under (ii) had a somewhat higher erosion of 1.7%, while the pellet material prepared under (i) and (iii) had an erosion degree of 10%, the pellet material prior to use in the catalytic hydration and after such use not exhibiting significant degrees of difference in the erosion.

What is claimed is:

1. In the process for the catalytic hydration of olefins to alcohols at elevated temperatures and pressures with water in gaseous phase, the improvement which comprises carrying out said hydration in the presence of a bentonite mineral catalyst prepared by treating said bentonite with mineral acid until the $Al_2O_3$ content thereof is reduced to below about 10% by weight of the bentonite, and impregnating the resulting mass with phosphoric acid.

2. Improvement according to claim 1 wherein said bentonite prior to the impregnating is treated with a mineral acid selected from the group consisting of hydrochloric, sulfuric and phosphoric acids, and mixtures thereof, at between about 20–110° C. to dissolve out the acid-soluble aluminum content until the $Al_2O_3$ content is reduced to between 5 and 0.6% by weight, the mineral acid having a concentration between about 5 and 25% by weight, the so-treated mass being washed with water and air dried at between about 110–120° C., the impregnating being carried out with phosphoric acid having a concentration between about 50 and 85% by weight, the mass being recovered from excess phosphoric acid and air dried at between about 110–120° C.

3. Improvement according to claim 1 wherein said temperature is about 300° C.

4. Improvement according to claim 1 wherein said olefin is ethylene and said corresponding alcohol is ethanol.

5. Improvement according to claim 1 wherein said mineral catalyst is prepared by treating said bentonite with mineral acid selected from the group consisting of hydrochloric, sulfuric and phosphoric acids, and mixtures thereof, until the $Al_2O_3$ content thereof is reduced to below about 10% by weight thereof, and impregnating the resulting mass with phosphoric acid, and wherein said olefin is ethylene and said corresponding alcohol is ethanol.

References Cited

UNITED STATES PATENTS

| | | | |
|---|---|---|---|
| 2,496,621 | 2/1950 | Deery | 260—641 |
| 2,579,576 | 12/1951 | Hickey | 252—450 |
| 2,974,054 | 3/1961 | Beamesderfer et al. | 252—450 |
| 2,981,697 | 4/1961 | Mickelson et al. | 252—450 |

(Other references on following page)

UNITED STATES PATENTS

| | | | |
|---|---|---|---|
| 3,170,885 | 2/1965 | Morrell | 252—437 |
| 2,107,515 | 2/1938 | Pent | 260—641 |
| 2,504,618 | 4/1950 | Archibald | 260—641 |
| 2,815,391 | 12/1957 | Taylor | 260—641 |
| 3,006,970 | 10/1961 | Beuther | 260—641 |
| 3,076,036 | 1/1963 | Hansen | 260—641 |

FOREIGN PATENTS

| | | | |
|---|---|---|---|
| 511,441 | 3/1955 | Canada | 260—641 |
| 786,238 | 11/1957 | Great Britain | 260—641 |

OTHER REFERENCES

Lange, "Handbook of Chemistry," 6th ed. (1946), pp. 152–5.

LEON ZITVER, Primary Examiner

J. E. EVANS, Assistant Examiner

U.S. Cl. X.R.

252—435